(12) United States Patent
Weder et al.

(10) Patent No.: US 6,183,234 B1
(45) Date of Patent: Feb. 6, 2001

(54) APPARATUS FOR FORMING AN ARTICLE

(75) Inventors: Donald E. Weder, Highland, IL (US); Frank Craig, Valley Park, MO (US); Michael J. King, Highland, IL (US)

(73) Assignee: Southpac Trust International, Inc.

( * ) Notice: Under 35 U.S.C. 154(b), the term of this patent shall be extended for 0 days.

This patent is subject to a terminal disclaimer.

(21) Appl. No.: 09/346,048

(22) Filed: Jul. 7, 1999

Related U.S. Application Data

(63) Continuation of application No. 08/927,008, filed on Sep. 10, 1997, now Pat. No. 5,985,187.

(51) Int. Cl.⁷ .................................................. B29C 45/84
(52) U.S. Cl. ......................... 425/136; 425/145; 425/150; 425/397
(58) Field of Search ................................. 425/126.1, 145, 425/150, 161, 149, 397, 400, 444, 387.1, 436 R, 388, 136; 264/40.1

(56) References Cited

U.S. PATENT DOCUMENTS

| | | | |
|---|---|---|---|
| 4,431,309 | 2/1984 | Sick et al. | 356/431 |
| 4,773,182 | 9/1988 | Weder et al. | 47/72 |
| 5,407,343 | 4/1995 | Weder et al. | 425/150 |
| 5,985,187 | * 11/1999 | Weder et al. | 425/145 |

OTHER PUBLICATIONS

Scientific Techologies Inc., Hayward, CA, light guards literature, 5 pages, not dated.

* cited by examiner

*Primary Examiner*—Tim Heitbrink
(74) *Attorney, Agent, or Firm*—Dunlap, Codding & Rogers, P.C.

(57) ABSTRACT

An apparatus and method for semi-automatically forming a sheet of material into an article, such as a flower pot cover, is provided. The apparatus includes a male die, a female die, a presence sensing assembly, and a control assembly. The presence sensing assembly is positioned for sensing the presence of an operator in a sheet feeding zone which is located between an operator's station and a zone of operation of the male die and the female die. The control assembly initiates an article forming sequence, wherein the male die and the female die are moved from a discharge position to a forming position to form the article from the sheet of material and subsequently returned to the discharge position, in response to the operator clearing the presence sensing assembly subsequent to the operator breaking the presence sensing assembly while positioning a sheet of material between the male die and the female die via the sheet feeding area.

13 Claims, 5 Drawing Sheets

APPARATUS FOR FORMING AN ARTICLE

CROSS-REFERENCE TO RELATED APPLICATIONS

This application is a continuation of U.S. Ser. No. 08/927,008, filed Sep. 10, 1997 now U.S. Pat. No. 5,985,187.

STATEMENT REGARDING FEDERALLY SPONSORED RESEARCH OR DEVELOPMENT

Not applicable.

BACKGROUND OF THE INVENTION

1. Field of the Invention

The present invention relates generally to an article forming apparatus, and more particularly, but not by way of limitation, to an improved apparatus and method for semi-automatically forming an article, such as a flower pot cover, from a sheet of material.

2. Brief Description of the Related Art

It has been known to provide a decorative covering for a flower pot by forming a sheet of material between a male die and a female die as disclosed in U.S. Pat. No. 4,773,182. This particular decorative cover is a preformed flower pot cover made by forming a sheet of material between a male die and a female die. In this process, a plurality of overlapping folds are formed in the material. The overlapping folds cooperate to provide structural strength to keep the preformed shape of the flower pot cover.

Several apparatuses are known for forming the decorative covers. These apparatuses range from manual machines to automatic machines. The manual machines require an operator to position a sheet of material between the male die and the female die, engage a start button to activate the machine whereby the male die is caused to mate with the female die, and remove the formed cover from the male die after the male die has been removed from the female die.

While manual machines are relatively inexpensive to manufacture and maintain, the operation of such machines is inefficient due to the number of steps required to be carried out by the operator to produce a cover. In addition, the repetitiveness of these steps required to produce a large number of covers can cause repetitive motion injuries to the operator. The operator is also at risk of being burned as the operator removes the formed cover from the male die, which is generally heated to facilitate the forming process.

While fully automatic machines avoid the above described problems associated with manual machines, they are often too expensive to manufacture and maintain to be cost efficient.

To this end, an improved apparatus for semi-automatically forming an article, such as a flower pot cover, from a sheet of material is needed which is economical to manufacture and operate and results in significant increases in production efficiency, while eliminating certain repetitive motions of an operator. It is to such an apparatus and method that the present invention is directed.

BRIEF SUMMARY OF THE INVENTION

The present invention is directed to an apparatus for forming an article from a sheet of material. The apparatus includes a male die, a female die, a presence sensing assembly, and a controller. The male die is shaped such that at least a portion of the male die is positionable in the opening of the female die. The male die and the female die are movable between a discharge position wherein the male die is removed from the opening of the female die such that the sheet of material is positionable between the male die and the female die and a forming position wherein at least a portion of the male die is disposed in the opening of the female die so as to form the article from the sheet of material positioned between the male die and the female die.

The presence sensing assembly is positioned for sensing the presence of an operator in a sheet feeding zone which is located between an operator's station and a zone of operation of the male die and the female die. The controller initiates an article forming sequence, wherein the male die and the female die are moved from the discharge position to the forming position for a period of time to form the article from the sheet of material and subsequently returned to the discharge position, in response to the operator clearing the presence sensing assembly subsequent to the operator breaking the presence sensing assembly while positioning a sheet of material between the male die and the female die via the sheet feeding area.

The present invention is also directed to a method for forming an article. The method includes the steps of positioning a sheet of material between a female die and a male die so as to break a presence sensing curtain formed across a sheet feeding zone; and clearing the presence sensing curtain so as to initiate a cover forming sequence wherein the male die and the female die are moved from a discharge position wherein the male die is removed from the opening of the female die such that the sheet of material is positionable between the male die and the female die to a forming position wherein at least a portion of the male die is disposed in the opening of the female die so as to form the article from the sheet of material positioned between the male die and the female die to form the article from the sheet of material and subsequently returned to the discharge position.

The objects, features and advantages of the present invention will become apparent from the following detailed description when read in conjunction with the accompanying drawings and appended claims.

DETAILED DESCRIPTION OF THE INVENTION

The present invention is generally directed to an apparatus for forming an article having a predetermined shape from a sheet of material which is commonly referred to in the art as a "film". The sheet of material contemplated to be used with the present invention is fabricated from a polymeric material selected from a group consisting of polypropylene, polyvinyl chloride, or combinations thereof. However, it will be appreciated that the sheet of material can be fabricated of paper, metal foil, cloth, denim, or burlap, for example. The sheet of material contemplated to be used with the present invention is also relatively thin having a thickness in a range from about 0.5 mils to about 30 mils, and the sheet of material is very flexible and flimsy so that the sheet of material will not normally maintain or hold a predetermined formed shape (non-shape sustaining). The present invention provides a means for forming a sheet of material of the type just described into a predetermined shape so the formed sheet of material substantially retains or maintains the formed shape thereby providing a means for making articles from such sheets of material in a more economical manner.

Figure 1:
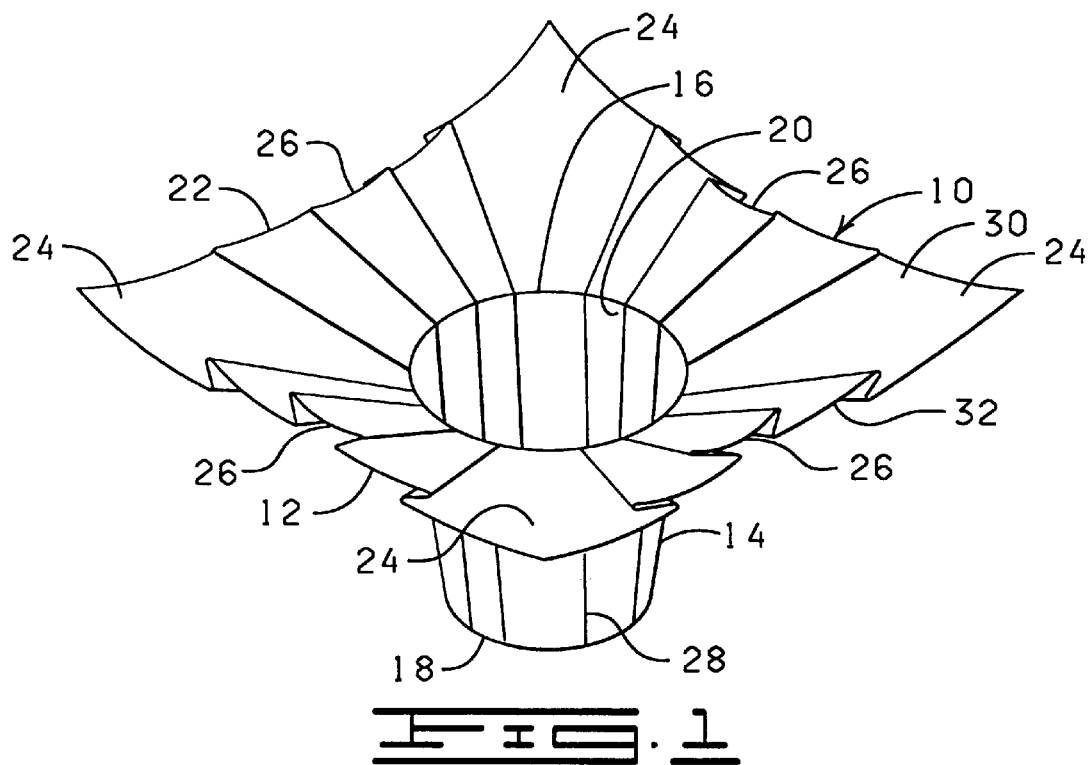
FIG. 1 is a perspective view of a flower pot cover constructed in accordance with the present invention.

An example of an article that can be formed using an article forming apparatus constructed in accordance with the present invention is illustrated in FIG. 1. FIG. 1 illustrates a flower pot cover 10 preferably, although not exclusively, formed from a generally square-shaped sheet of material 12. The flower pot cover 10 includes a base 14 having an opened upper end 16, a closed lower end 18, an object opening 20 extending through the upper end 16 and a decorative border 22 which extends angularly upwardly and outwardly from the upper end 16 of the base 14. The decorative border 22 includes four accentuated and sculptured flared petal-like portions 24. Each flared petal-like portion 24 terminates with a pointed end which is formed by one of the four corners of the square-shaped sheet of material 12. Further, each flared-like petal portion 24 extends a distance angularly upwardly and outwardly from the upper end 16 of the base 14 terminating with the pointed end of the flared petal-like portion 24. The flared petal-like portions 24 are spaced apart circumferentially about the decorative border 22 with the flared petal-like portions 24 being spaced apart at about ninety degree intervals, and a flare connecting portion 26 disposed between each pair of adjacent flared petal-like portions 24. Each of the flare connecting portions 26 extends a distance angularly upwardly and outwardly from the upper end 16 of the base 14 less than the distances which the pointed ends of the flared petal-like portions 24 extend from the upper end 16 of the base 14.

The object opening 20 of the flower pot cover 10 is shaped and sized to receive a flower pot (not shown). When a flower pot is disposed in the object opening 20 of the flower pot cover 10, the base 14 substantially encompasses the outer peripheral surface of the flower pot extending generally between the upper and the lower ends of the flower pot with the upper end 16 of the base 14 being disposed generally near the upper end of the flower pot and the lower end 18 of the flower pot cover 10 being disposed generally near the lower end of the flower pot. The closed lower end 18 of the flower pot cover 10 extends across and encompasses the lower end of the flower pot. When the flower pot cover 10 is disposed about the flower pot, the decorative border 22 of the flower pot cover 10 extends a distance angularly upwardly and outwardly from the upper end of the flower pot and the flower pot cover 10 extends generally circumferentially about the upper end of the flower pot.

The base 14 of the flower pot cover 10 includes a plurality of overlapping folds 28 (only one of the overlapping folds 28 being designated by a reference numeral in the drawings). A substantial portion of the overlapping folds 28 extend at angles to a vertical direction and at angles to a horizontal direction, the various angles being arbitrary and varying from one overlapping fold 28 to another overlapping fold 28. Further, the base 14 includes a plurality of overlapping folds 28 with the various overlapping folds 28 being positioned at various positions about the entire outer peripheral surface of the base 14 and at various positions between the upper and the lower ends 16 and 18 of the base 14.

The overlapping folds 28 provide an overall decorative appearance to the base 14. However, more significantly, the overlapping folds 28 provide a mechanical strength to the base 14 for enabling the base 14 to stand upright (substantially retain the shape formed by the apparatus of the present invention described below) on the closed lower end 18 of the base 14. In this manner, the base 14 of the flower pot cover 10 has sufficient mechanical strength to stand upright about a flower pot without the necessity of mechanically connecting the base 14 to a flower pot, other than the connection normally provided when the lower end of a flower pot engages the lower end 18 of the flower pot cover 10 when the flower pot cover 10 is disposed about a flower pot.

Each overlapping fold 28 extends an arbitrary distance and most of the overlapping folds 28 extend at arbitrary angles over the base 14 which enhances the mechanical strength of the base 14 as compared to the mechanical strength which might be imparted to the base 14 by overlapping folds extending only in vertical or horizontal directions. Significantly, the overlapping folds 28 permit relatively thin sheets (films) of material to be utilized to form the decorative flower pot cover 10, in a manner and for reasons to be discussed further below.

The sheet of material 12 has an upper surface 30 and a lower surface 32, and either the upper surface 30 or the lower surface 32 or both the upper surface 30 and the lower surface 32 is adapted to be bondable so that when portions of the bondable surface are brought into bondable contact, such portions are bondably connected. The overlapping folds 28 are formed by overlapping portions of the bondable surface and bringing such overlapping portions into bondable engagement or contact. In this manner, the overlapping folds 28 are permanently fixed in the flower pot cover 10. When an overlapping fold 28 is formed with a portion of the sheet of material 12 during the forming of the flower pot cover 10, portions of the upper surface 30 are overlapped and brought into bondable contact or engagement and, with respect to the same overlapping fold 28, portions of the lower surface 32 also are overlapped and brought into bondable contact or engagement.

As mentioned before, at least one of the upper and the lower surfaces 30 and 32 is prepared to form a bondable surface which is adapted to be bonded to portions of a similar bondable surface when bondably contacted with a similar bondable surface portion. Thus, in those instances when only the lower surface 32 is prepared to form a bondable lower surface 32, the overlapping portions of the bondable lower surface 32 are brought into bondable contact during the forming of the flower pot cover 10 and such overlapping portions are bonded to form the overlapping folds 28. The corresponding overlapping portions of the upper surface 30 are not bonded. Similarly, in those instances when only the upper surface 30 is prepared to form a bondable upper surface 30, the overlapping portions of the bondable upper surface 30 are brought into bondable contact during the forming of the flower pot cover 10 and such overlapping portions are bonded to form the overlapping folds 28. The corresponding overlapping portions of the lower surface 32 are not bonded. Finally, in those instances when both the upper and the lower surfaces 30 and 32 are prepared to form bondable upper and lower surfaces 30 and 32, the overlapping portions of the upper and the lower surfaces 30 and 32 forming each overlapping fold 28 are brought into bondable contact during the forming of the flower pot cover 10 and such overlapping portions of the upper and the lower surfaces 30 and 32 are bonded to form the overlapping folds 28.

It has been found to be necessary only to prepare one of the upper and the lower surfaces 30 or 32 to form a bondable surface so the flower pot cover 10 is formable from the film sheet of material 12 having sufficient mechanical strength to retain its formed shape in accordance with the present invention. However, it should be noted that preparing both the upper and the lower surfaces 30 and 32 to form bondable surfaces provides additional mechanical strength which may be desired in some applications and particularly in those applications where the additional mechanical strength is needed to enable the formed article to maintain or retain its formed shape. Such additional strength may be desired either because of the particular shape of the article or the particular thickness or characteristics of the particular film forming the sheet of material 12. Various techniques are utilized to prepare the sheet of material 12 with at least one bondable surface in accordance with the present invention.

One technique for preparing the bondable surfaces is to utilize polyvinyl chloride film to form the sheet of material 12 which is heat sealable. When utilizing a processed organic polymer heat sealable film, the upper and the lower surfaces 30 and 32 of the sheet of material 12 are bondable surfaces and the sheet of material 12 must be heated during the forming of the article or, more particularly, the forming of overlapping folds 28. Thus, in this instance, the term "bondable contact" or "bondable engagement" means contacting engagement and the application of the required amount of heat to effect heat sealable bonding of the contacting surfaces.

It should be noted that a light activated adhesive also is suitable for use in preparing the bondable surface in accordance with the present invention. In this instance, heating elements would not be necessary; however, means for lighting the areas to be bonded would be necessary which might be effected by utilizing a light source during the forming of the flower pot cover 10. In this instance, the term "bondable contact" or "bondable engagement" means contacting engagement and the applications of sufficient light to effect the bond.

Another technique for preparing the bondable surfaces is to utilize a non-heat sealable film to form the sheet of material 12 and to apply a heat sealable coating to either the upper surface 30 or the lower surface 32 or both. Heat sealable adhesives are commercially available. The term "bondable contact" or "bondable engagement" as used in this instance means contacting engagement and the application of the required amount of heat to effect heat sealable bonding of the contacting surfaces. The heat sealable coating also can be a heat sealable lacquer, a pressure sensitive adhesive which also requires heat to effect the bond, or a non-melt adhesive.

An additional technique for preparing the bondable surfaces 30 or 32 is to utilize a non-heat sealable film to form the sheet of material 12 and to apply a contact adhesive coating to either the upper surface 30 or the lower surface 32 or both. Contact adhesives are commercially available. The term "bondable contact" or "bondable engagement" in this instance means contacting engagement sufficient to effect the adhesive bond between the contacted surfaces.

For aesthetic purposes, it is preferable that the decorative border 22 and particularly the flared petal-like portions 24 remain substantially smooth and substantially free of the overlapping folds. Also, it is desirable that the flare connecting portions 26 also remain substantially smooth and substantially free of overlapping folds.

Figure 2:
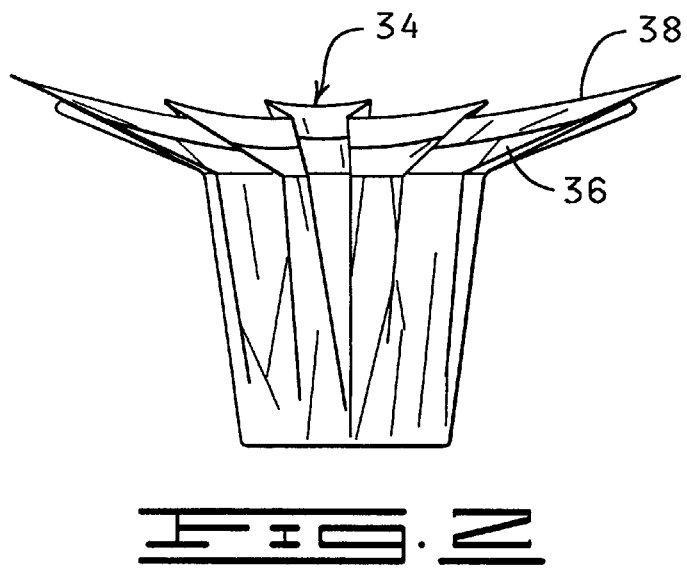
FIG. 2 is a perspective view of another flower pot cover constructed in accordance with the present invention.

It may be desirable to utilize more than one sheet of material to form a flower pot cover. FIG. 2 shows a flower pot cover 34 which is constructed from a first sheet of material 36 layered with a second sheet of material 38. It will be appreciated that the flower pot cover 34 is similar in construction to the flower pot cover 10 described above with the exception that the flower pot cover 34 is formed from two layered sheets of material rather than only one sheet of material.

As described above, one advantageous use of the present invention is to form flower pot covers, such as the flower pot covers 10 and 34 described above. However, it will be understood that a flower pot cover represents only one article which can be formed into a predetermined shape in accordance with the present invention and that the present invention specifically contemplates various and numerous other types of articles such as vases, hats, saucers, easter baskets, containers for use in microwave ovens, rose stem boxes, egg cartons, potting trays, pans, trays, bowls, basket liners, candy trays, drinking cups, candy cups, flower pots, planter trays for growing plants, disposable bowls and dishes, corsage boxes and containers, food service trays (such as those used for bakery goods, french fries, ground beef, liver and other raw meats in supermarkets, for example), boxes for hamburgers or pies and the like, and various other articles. The term "article" as used herein is intended to encompass all the specific articles just mentioned and the term "article" also is intended to be broad enough to encompass any other article having a predetermined shape which the article must substantially maintain in order to function as intended.

Figure 3:
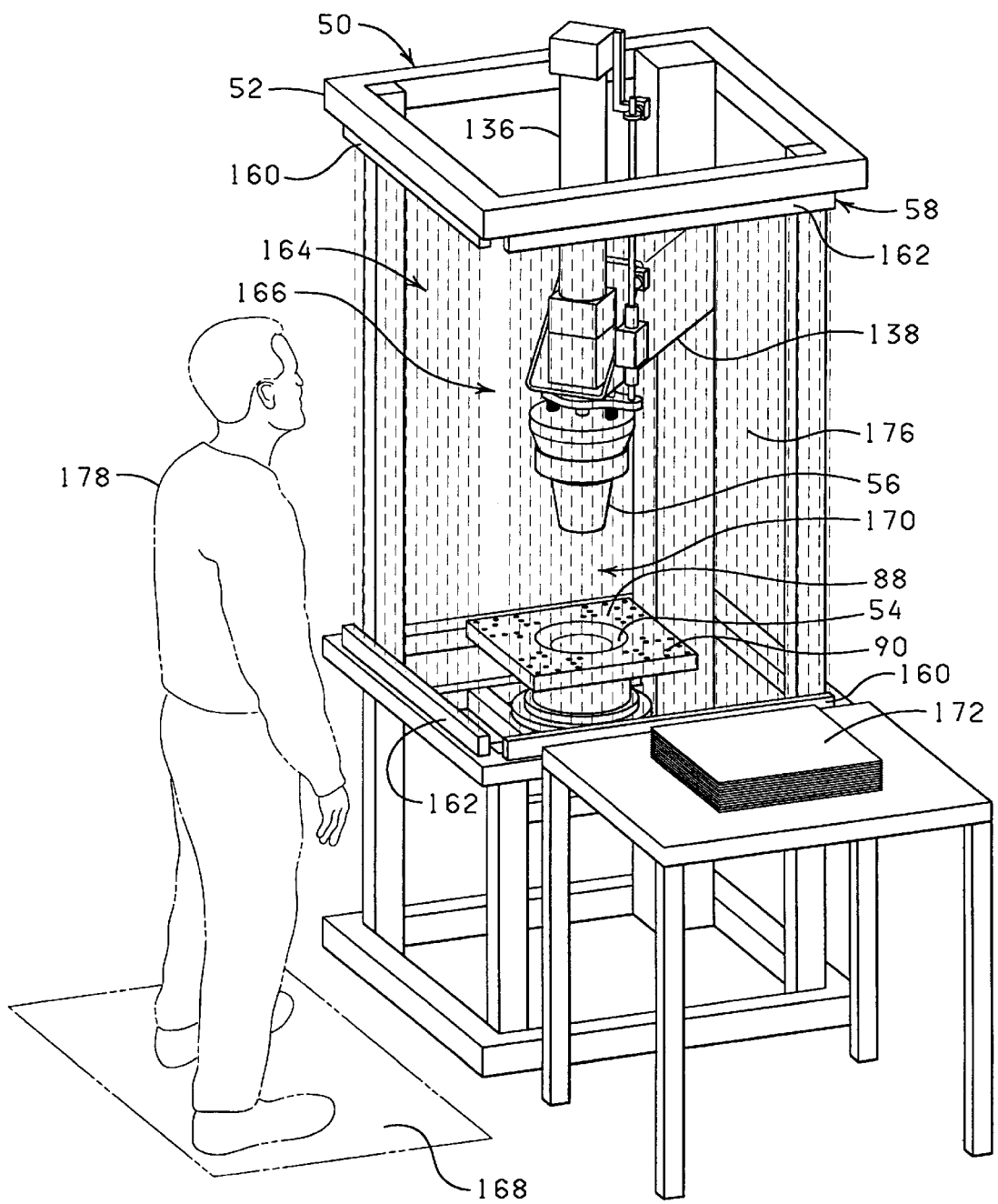
FIG. 3 is a perspective view of an article forming apparatus constructed in accordance with the present invention.
Figure 4:
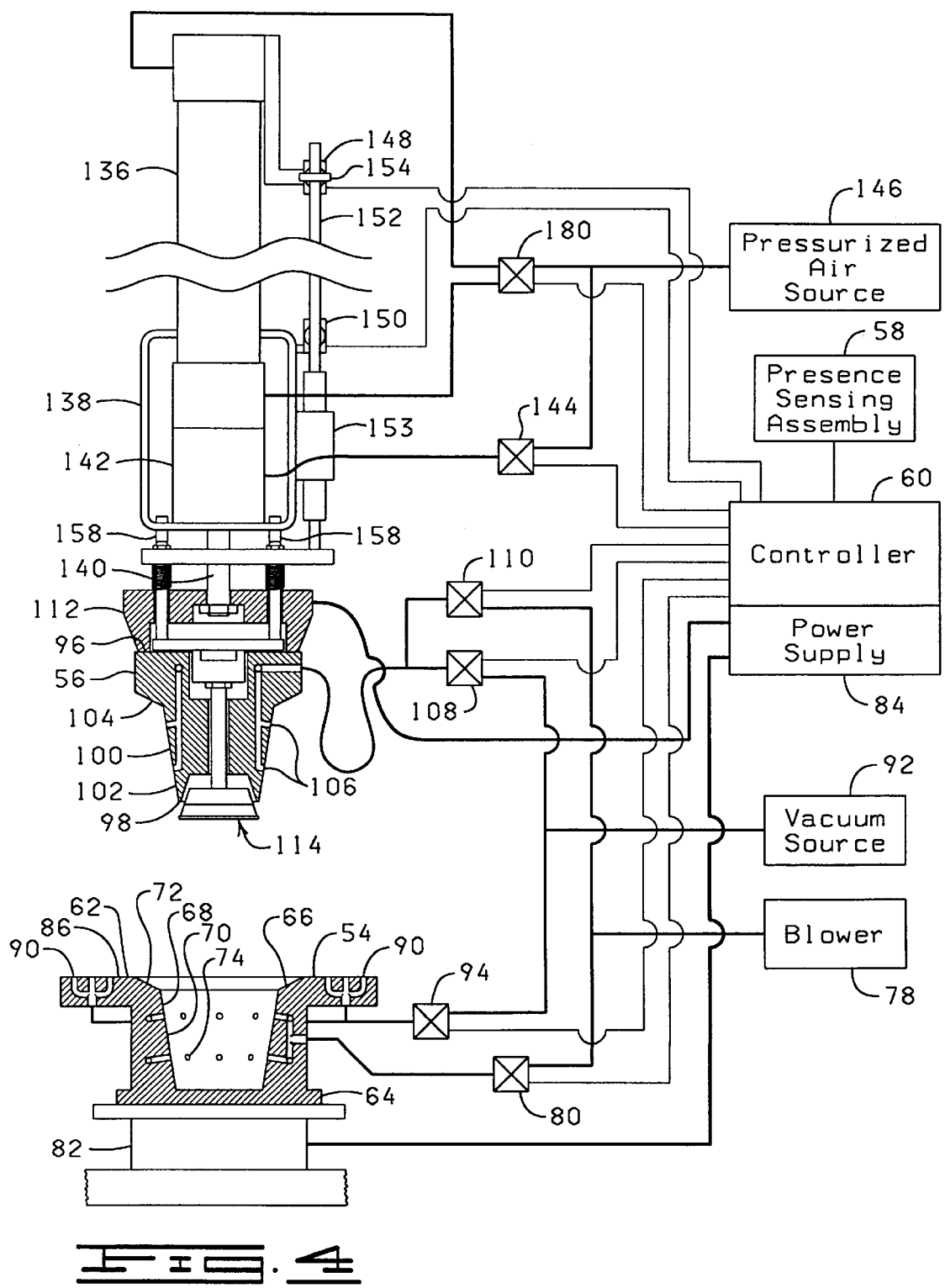
FIG. 4 is a partial schematic, partial cross sectional representation of the article forming apparatus illustrating the male die and the female die in a discharge position.
Figure 5:
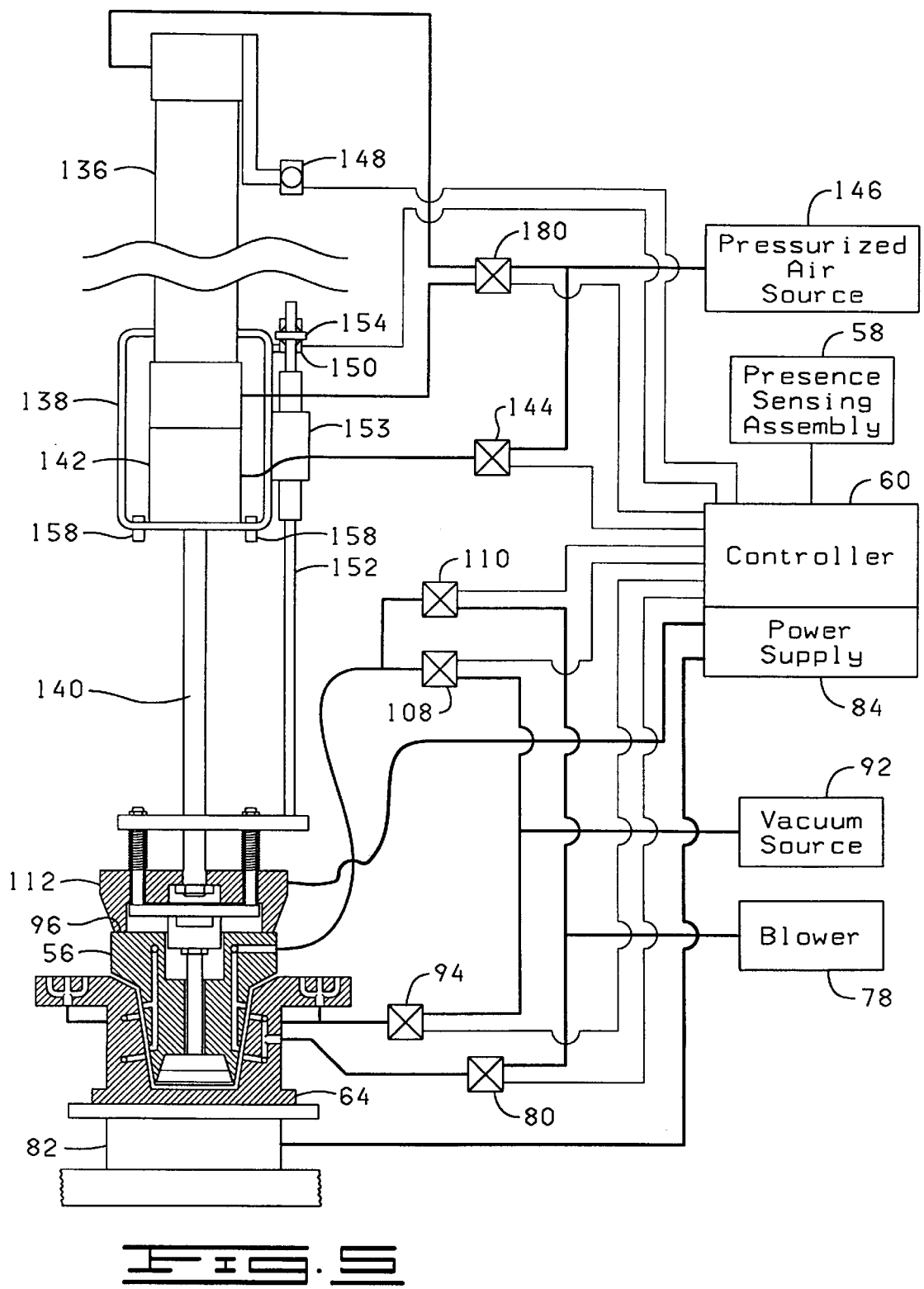
FIG. 5 is a partial schematic, partial cross sectional representation of the article forming apparatus illustrating the male die and the female die in a forming position.

Referring now to FIGS. 3–5, an article forming apparatus 50 constructed in accordance with the present invention is illustrated. The article forming apparatus 50 is adapted to form at least one sheet of material into an article, such as the flower pot cover 10 or the flower pot cover 34. Broadly, the article forming apparatus 50 includes a support frame 52, a female die 54, a male die 56, a presence sensing assembly 58, and a controller 60 (FIGS. 4 and 5).

The female die 54 is secured to the support frame 52 and is characterized as having an upper end 62, a lower end 64, and an opening 66 formed through the upper end 62 of the female die 54 extending a distance generally toward the lower end 64 of the female die 54. The opening 66 is defined by a female die surface 68.

The female die surface 68 includes a base portion 70 having an upper end and a lower end. The base portion 70 generally is frusto-conically shaped, thus the diameter of the base portion 70 generally near the lower end thereof is smaller than the diameter of the base portion 70 generally near the upper end thereof.

The female die surface 68 also includes a flared portion 72 having an upper end and a lower end. The flared portion 72 extends angularly outwardly and upwardly from the upper end of the base portion 70.

The female die 54 is provided with a plurality of openings 74 formed in the female die surface 68. The openings 74 are connected to a blower 78 such that fluid communication is established between the openings 74 and the blower 78. A control valve 80 is interposed between the blower 78 and the openings 74. In one position of the control valve 80, communication is established between the blower 78 and the openings 74 in the female die 54.

A heater element 82 is secured to the lower end 64 of the female die 54 to heat the female die surface 68 to a predetermined temperature level during the operation of the article forming apparatus 50. The heater element 82 is connected to an electrical power source 84. A temperature sensing device (not shown) is positioned in the female die 54 and connected to the electrical power source 84 to sense the temperature level of the female die surface 68 and maintain the temperature level of the female die surface 68 at a desired predetermined temperature level.

The female die 54 is provided with a horizontal support surface 86 which circumscribes the opening 66 of the female die 54. The support surface 86 includes four circumferentially spaced material holddown areas 88 (only one of the material holddown areas 88 being designated by reference numerals in FIG. 3). Each material holddown area 88 is provided with a plurality of openings 90 (only one of the openings 90 being designated by reference numerals in FIG. 3) generally arranged to form a triangular configuration and which are in communication with a vacuum source 92. A control valve 94 (FIGS. 4 and 5) is interposed between the openings 90 and the vacuum source 92; the vacuum source 92 being in communication with the openings 90 in the support surface 86 in the opened position of the control valve 94.

The male die 56 is shaped and sized to formingly mate with the female die 54 with a sufficient clearance therebetween to accommodate portions of a sheet or sheets of material during the forming of an article, such as the flower pot cover 10 or the flower pot cover 34. The male die 56 is characterized as having an upper end 96, a lower end 98, and a male die surface 100. The male die surface 100 extends a distance generally from the lower end 98 toward the upper end 96 of the male die 56. A portion of the male die surface 100 forms a base portion 102 of the male die surface 100. The base portion 102 of the male die surface 100 has an outer peripheral surface which is shaped about the same as the outer peripheral surface of a flower pot; the dimensions of the base portion 102 being slightly larger than the comparable dimensions of the outer peripheral surface of a flower pot so that a flower pot cover formed by the article forming apparatus 50 of the present invention will fit generally about the outer peripheral surface of the flower pot when the flower pot cover is disposed about the flower pot.

The base portion 102 has an upper end and a lower end. The lower end of the base portion 102 coincides with and forms the lower end 98 of the male die 56. Thus, the base portion 102 of the male die surface 100 generally is frustoconically shaped with thediameter of the base portion 102 generally at the lower end being smaller than the diameter of the base portion 102 generally at the upper end of the base portion 102. The male die surface 100 also includes a flared portion 104 which flares a distance angularly outwardly and upwardly from the upper end of the base portion 102. The flared portion 104 of the male die surface 100 is characterized as having an upper end and a lower end with the lower end thereof being connected to the upper end of the base portion 102.

A plurality of openings 106 (only two openings 106 being designated by a reference numeral in FIGS. 4 and 5) are formed through the male die 56 with each opening 106 extending through the male die surface 100. The openings 106 are connected to the blower 78 and the vacuum source 92 such that fluid communication is established between the openings 106 and the blower 78 and the openings 106 and the vacuum source 92. A control valve 108 is interposed between the vacuum source 92 and the openings 106. In one position of the control valve 108, communication is established between the vacuum source 92 and the openings 106 in the male die 56, and in one position of the control valve 110 communication is established between the blower 78 and the openings 106.

A heater element 112 is secured to the upper end 96 of the male die 56 to heat the male die surface 100 to a predetermined temperature level during the operation of the article forming apparatus 50. The heater element 112 is connected to the electrical power source 84. A temperature sensing device (not shown) is positioned in the male die 56 and connected to the electrical power source 84 to sense the temperature level of the male die surface 100 and maintain the temperature level of the male die surface 100 at a desired predetermined temperature level.

Figure 6:
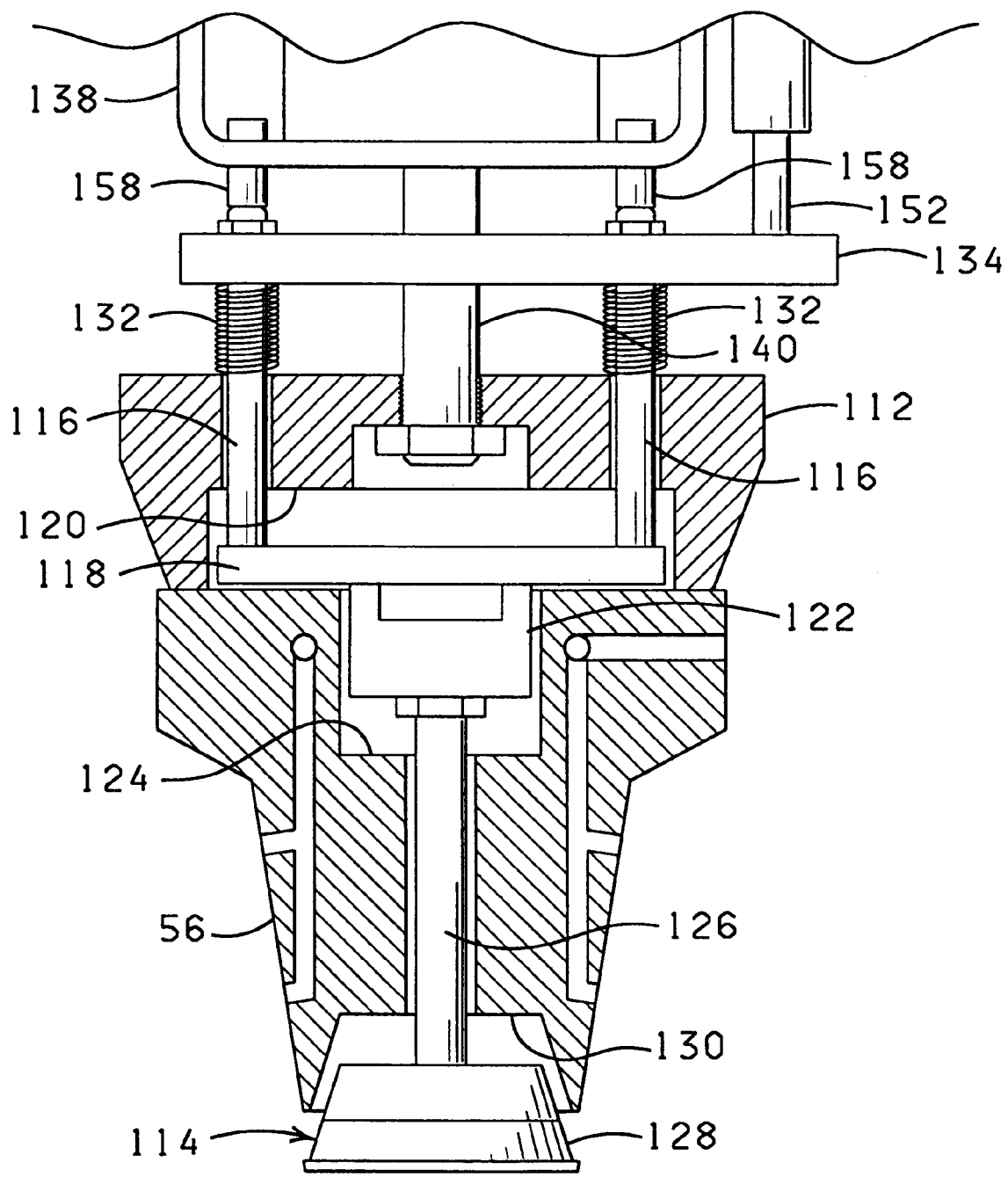
FIG. 6 is an enlarged, partially cross sectional view of the male die illustrating the plunger assembly.

As best shown in FIG. 6, the male die 56 and the heater element 112 are adapted to receive a plunger assembly 114 for assisting in the removal of a formed article from the male die 56. The plunger assembly 114 includes a pair of plunger spring support shafts 116 extendable through and from the upper end of the heater element 112. The plunger spring support shafts 116 are connected to a cross brace 118 positioned in a cavity 120 formed in the heater element 112. The cross brace 118 is connected to a center support 122 which is slidably disposed in a cavity 124 formed in the upper end of the male die 56 and which is adapted to detachably receive one end of a shaft 126. An ejector cone 128 is secured to the other end of the shaft 126. The ejector cone 128 is shaped to fit in an aperture 130 formed in the lower end 98 of the male die 56 such that the lower end of the ejector cone 128 is substantially flush with the lower end 98 of the male die 56 when the plunger assembly 114 is in a retracted condition, as shown in FIG. 5.

A spring 132 is disposed about each of the plunger spring support shafts 116 and placed in tension between the upper end of the heater element 112 and a spring retaining plate 134 which is secured to the plunger spring support shafts 116. With the springs 132 in tension, the springs 132 exert an upward force on the spring retaining plate 134 and thus the plunger spring support shafts 116, thereby causing the plunger assembly 114 to be in the retracted condition. By exerting a force on the upper ends of the plunger spring support shafts 116, the plunger assembly 114 is caused to move to an extended condition wherein the lower end of the ejector cone 128 is extended a distance out from the lower end 98 of the male die 56 as shown in FIG. 4. The plunger assembly 114 need only extend a slight distance, such as approximately an eighth of an inch, to dislodge an article from the male die 56. However, the degree to which the plunger assembly 114 extends has been exaggerated in FIGS. 4 and 6 for the purpose of illustration.

The male die 56 is supported above the female die 54 by a cylinder 136 whereby the male die 56 is movable between a discharge position (FIG. 4) and a forming position (FIG. 5). In the discharge position, the male die 56 is removed from the female die 54 so that a sheet of material can be positioned between the male die 56 and the female die 54 and so that a formed article, such as the flower pot cover 10 or 34, is removable from the male die 56. In the forming position, the male die 56 is matingly disposed into the female die 54. The cylinder 136 is mounted to the support frame 52 via a horizontal support beam 138, and the cylinder 136 has a reciprocating rod 140 which has one end connected to the heater element 112.

To assist in stopping the male die 56 when the male die 56 is traveling from the discharge position to the forming position, the cylinder 136 is provided with a pneumatically operated brake or locking device 142 which is frictionally engagable with a portion of the rod 140 for stopping the male die 56 in a manner to be described in greater detail below. A control valve 144 is interposed between a pressurized air source 146 and the locking device 142. In one position of the control valve 144, communication is established between the pressurized air source 146 and the locking device 142 to cause the locking device 142 to lockingly engage the rod 140. A suitable double acting lock cylinder is commercially available from SMC Corporation of Tokyo, Japan.

In order to signal the controller 60 when the male die 56 is in the discharge position or the forming position, an upper proximity switch 148 and a lower proximity switch 150 are mounted to the cylinder 136 in a vertically spaced apart relationship. A vertical rod 152 extends upward from the spring retaining plate 134 and slidably supported by a bushing 153 which is connected to the horizontal support beam 138. The vertical rod 152 is provided with a plate member 154 at the distal end thereof such that the plate member 154 trips the upper proximity switch 148 when the male die 56 is in the discharge position (FIG. 4) and trips the lower proximity switch 150 when the male die 56 is in the forming position (FIG. 5).

The horizontal support beam 138 is provided with a pair of adjustable stop members 158 which extend downward from the horizontal support beam 138 so as to engage the upper end of the plunger spring support shafts 116 when the male die 56 is in the discharge position and thereby force the plunger assembly 114 into the extended position. Upon the male die 56 being moved from the discharge position, the springs 132 move the plunger assembly 114 to the retracted position.

A guard or cage assembly (not shown for the sake of clarity) may be extended upward from the spring retaining plate 134 and about the cylinder 136 so as to be adapted to move along with the male die 56 to shield the area between the spring retainer plate 134 and the horizontal support beam 138.

As best illustrated in FIG. 3, the presence sensing assembly 58 includes a pair of transmitters 160 and a pair of corresponding receivers 162 secured to the periphery of the support frame 52 for forming a presence sensing curtain 164 (depicted in dashed lines) across a sheet feeding zone 166. The sheet feeding zone 166 is located between an operator's station 168 and a zone or point of operation 170 of the male die 56 and the female die 54 defined by the range of motion of the male die 56 relative to the female die 54. The sheet feeding zone 166 is the area where an operator has access through the support frame 52 to pass a sheet of material from a sheet supply area 172 and positions the sheet of material between the male die 56 and the female die 54. The sheet feeding zone 166 is shown in FIG. 3 to extend along two adjacent sides of the support frame 52. The other two sides of the support frame 52 will be shielded by a cage or guard assembly which has not been depicted for the sake of clarity. It will be appreciated that the sheet feeding zone 166 can vary in size and location about the support frame 52.

The transmitters 160 transmit a sensor media 176 (the sensor media 176 being indicated by the dashed lines in FIG. 3). The receivers 162 detect the sensor media 176 transmitted by the transmitters 160 to provide a signal to the controller 60 indicative of whether an object is present across the presence sensing curtain 164 of the sheet feeding zone 166. It should be noted that the transmitters 160 and the receivers 162 are positioned to produce a vertical presence sensing curtain, but the transmitters 160 and receivers 162 could also be positioned to produce a horizontal presence sensing curtain.

A preferred sensor media 176 is invisible infrared light. However, it will be appreciated that the sensor media 176 can be any media capable of extending across the sheet feeding zone 166 and to maintain a desirable amount of sensitivity in the presence sensing curtain 164. Examples of other suitable sensor medias are visible light, ultraviolet light, lasers, air, sound waves, and combinations thereof.

Control and Operation

The article forming apparatus 50 is constructed to semi-automatically form an article, such as the flower pot cover 10 or the flower pot cover 34, from a sheet of material. To this end, conventional control systems are utilized to synchronize the operation of the various components of the article forming apparatus 50 described above.

Referring to FIGS. 4 and 5, a schematic illustration of the article forming apparatus 50 is shown. The controller 60 outputs signals to the various valves described above at predetermined intervals so as to synchronize the operation of the various components of the article forming apparatus 50. Control valves and the programmable controller constructed to operate in the manner described herein are well known in the art. Thus, a detailed description of such components is not believed necessary to enable one skilled in the art to understand the operation of the article forming apparatus 50 of the present invention.

The controller 60 is initially set up by inputting desired variables which include single or double sheet feeding and the length of time the male die 56 is mated with the female die 54 (dwell time). The temperature of the male and female dies 56 and 54 is set via a temperature controller (not shown). The temperature controller can be incorporated into the controller 60 or alternatively set up as a separate unit.

An article forming sequence, wherein the male die 56 and the female die 54 are moved from the discharge position to the forming position for a period of time to form the article from a sheet of material and subsequently returned to the discharge position, is initiated upon an operator 178 (depicted in phantom in FIG. 3) breaking the presence sensing curtain 164 and subsequently clearing the presence sensing curtain 164. That is, in response to the hands and arms of the operator 178 clearing the presence sensing curtain 164 subsequent to the operator 178 breaking the presence sensing curtain 164 while positioning a sheet of material between the male die 56 and the female die 54, several components of the article forming apparatus 50 are simultaneously actuated to cause a flower pot cover 10 to be formed.

More specifically, upon the operator 178 clearing the presence sensing curtain 164, the controller 60 outputs a signal to the valve 94 to activate the vacuum in the support surface 86 to hold the sheet of material to the support surface 86. The controller 60 additionally outputs a signal to a valve 180 to cause the cylinder 136 to extend so as to force the male die 56 from the discharge position to the forming position.

The heating element 112 in the male die 56 and the heating element 82 in the female die 54 each are connected to the electrical power source 84 so the heating element 112 heats the male die surface 100 to the predetermined temperature level and the heating element 82 in the female die 54 heats the female die surface 68 to the predetermined temperature level.

Because the openings 90 in the material holddown areas 88 are in communication with the vacuum source 92, the portions of the sheet of material generally near each of the corners of the sheet of material are biased or pulled generally toward the respective material holddown areas 88. The amount of vacuum applied through the openings 90 is relatively slight so the vacuum tends to bias or pull the portions of the sheet of material generally near the corners toward the respective material holddown areas 88, yet the vacuum is small enough to permit the corner portions of the sheet of material to be pulled across the respective material holddown areas 88 toward the opening 66 in the female die 54 during the forming of the flower pot cover 10.

As the male die 56 moves in a downward direction, the male die 56 moves to a position wherein the lower end 98 of the male die 56 initially engages the portion of the sheet of material disposed over the opening 66 in the female die 54. The male die 56 continues to move in the downward direction to the forming position wherein the male die surface 100 is matingly disposed with the female die 54 with the lower end 98 of the male die 56 being disposed generally near the lower end 64 of the female die 54 with portions of the sheet of material being disposed generally about the male die surface 100 and generally between the male die surface 100 and the female die surface 68. The vacuum applied through the openings 90 in the material holddown areas 88 permits the portions of the sheet of material disposed on the material holddown areas 88 to be biased toward the material holddown areas 88 and yet to be slidingly moved in the direction generally toward the opening 66 in the female die 54 as the male die 56 engages the sheet of material and pushes the sheet of material into the opening 66 as the male die 56 is moved to the forming position.

In the forming position, the base portion 70 of the female die 54 cooperates with the base portion 102 of the male die 56 to form the portion of the sheet of material disposed therebetween into the base 14 of the flower pot cover 10. The flared portion 72 of the female die 54 cooperates with the flared portion 104 of the male die 56 to form the portion of the sheet of material disposed therebetween into the lower portion of the decorative border 22 generally adjacent the upper end of the base 14, thereby establishing or forming the angle at which the decorative border 22 extends upwardly and outwardly from the opened upper end 16 of the base 14. The four flared petal-like portions 24 of the decorative border 22 are disposed on the respective material holddown areas 88 during the forming of the pot cover 10.

Upon the male die 56 reaching the forming position, the plate member 154 triggers the lower proximity switch 150 (FIG. 5) thereby causing the controller 60 to output a signal to the valve 94 to terminate the vacuum in the holddown areas 88 and to initiate the timing sequence that maintains the male die 56 in the female die 54 for a predetermined length of time. The amount of time the male die 56 remains in the forming position (dwell time) can be set to vary from about 0.1 seconds to about 10 seconds depending on the type of sheet material being utilized.

Upon the expiration of the dwell time, the controller 60 sends a signal to the valve 108 so as to cause the vacuum to be directed to the male die 56, and the controller 60 sends a signal to the valve 80 to cause blower air to be directed to the openings 74 in the female die 54 so that the formed flower pot cover 10 is held against the male die 56. At the same time, the vacuum and blower are activated in the male and female dies 56, 54, respectively, the controller 60 sends a signal to the valve 180 to cause the cylinder 136 to retract.

The retraction of the cylinder 136 removes the male die 56 from the female die 54 with the formed flower pot cover 10 disposed on the male die 56.

When the cylinder 136 reaches the retracted position such that the male die 56 is in the discharge position, the plunger assembly 114 is caused to extend. In addition, the upper proximity switch 148 is triggered by the plate member 154 which causes the controller 60 to output a signal to the valve 108 to cause the vacuum on the male die 56 to be terminated, and a signal to the valve 110 to cause blower air to be directed to the male die 56. The blower air cooperates with the plunger assembly 114 to strip the pot cover 10 from the male die 56 without requiring the operator 178 to contact the male die 56. The triggering of the upper proximity switch 148 further indicates that the male die 56 is in the discharge position and thus ready for another cover forming sequence.

In addition to the presence sensing assembly 58 functioning to initiate the cover forming sequence, the presence sensing assembly 58 functions as a safety guard to protect personnel operating the article forming apparatus 50. More specifically, if the presence sensing curtain 164 is broken as the male die 56 is traveling from the discharge position to the forming position, the controller 60 is programmed to send a signal to the valve 180 so as to close the valve 180 and cause the cylinder to stop, and the controller 60 sends a signal to the valve 144 to cause the locking device 142 to engage the rod 140 to assist in the stoppage of the male die 56. The controller 60 may further be programmed to cause the male die 56 to be stopped if the presence sensing curtain 164 is broken while the male die 56 is traveling from the forming position to the discharge position. However, to increase production efficiency, it is preferable that the male die 56 not be stopped due to the breakage of the presence sensing curtain 164 while the male die 56 is traveling from the forming position to the discharge position. It will be appreciated that this permits the operator 178 to place another sheet of material between the male die 56 and the female die 54 upon the male die 56 being removed from the female die 54, receive the just formed pot cover as it is stripped from the male die 56, and initiate the next article forming sequence by clearing the presence sensing curtain 164 with the just formed pot cover in hand.

The flower pot cover 34 (FIG. 2) is formed in an identical manner as described above in reference to the forming of the flower pot cover 10, except that the flower pot cover 34 is fabricated from two layered sheets of material rather than only one sheet of material and thus requires the placement of two sheets of material between the male die 56 and the female die 54. The two sheets of material can be positioned between the male die 56 and the female die 54 simultaneously. In this case, the controller 60 is programmed to operate in the manner described above with the article forming sequence being initiated when the operator breaks the presence sensing curtain 164 and subsequently clears the presence sensing curtain 164. Alternatively, however, the flower pot cover 34 may be formed by positioning the two sheets of material separately. In this instance, the controller 60 is programmed so that the presence sensing curtain 164 must be broken and cleared twice to initiate the cover forming sequence described above. In other words, the article forming sequence will not be initiated until the operator 178 positions the first sheet of material between the male die 56 and the female die 54 thereby breaking the presence sensing curtain 164 for a first time, clears the presence sensing curtain 164 for a first time, positions the second sheet of material over the first sheet of material thereby breaking the presence sensing curtain 164 for a second time, and clears the presence sensing curtain 164 for a second time.

From the above description it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed is:

1. An apparatus for forming an article from a sheet of material, the apparatus comprising:

a female die having an opening intersecting one end thereof;

a male die shaped such that at least a portion of the male die is positionable in the opening of the female die, the male die movable between a discharge position wherein the male die is removed from the opening of the female die such that the sheet of material is positionable between the male die and the female die and a forming position wherein at least a portion of the male die is disposed in the opening of the female die so as to form the article from the sheet of material positioned between the male die and the female die, the range of motion of the male die relative to the female die defining a zone of operation of the male die and the female die;

presence sensing means for sensing the presence of an operator in a sheet feeding area which is located between an operator's station and the zone of operation of the male die and the female die; and control means for initiating an article forming sequence, wherein the male die is moved from the discharge position to the forming position to form the article from the sheet of material and subsequently returned to the discharge position, in response to the operator clearing the presence sensing means subsequent to the operator breaking the presence sensing means while positioning the sheet of material between the male die and the female die via the sheet feeding area.

2. The apparatus of claim 1 wherein the presence sensing means comprises:

a plurality of light transmitters and a plurality of corresponding light receivers for forming a presence sensing light curtain across the sheet feeding zone.

3. The apparatus of claim 1 further comprising:

means for holding the formed article against the male die as the male die is moved from the forming position to the discharge position; and means for stripping the article from the male die after the male die has been moved from the forming position to the discharge position.

4. The apparatus of claim 3 wherein the means for stripping the article comprises:

a plunger slidably disposed in the male die so as to be movable between a retracted position wherein the plunger is disposed in the male die and an extended position wherein a portion of the plunger extends from the lower end of the male die.

5. The apparatus of claim 3 wherein the means for stripping the article comprises:

means for producing a current of air through the male die to blow the formed article off of the male die.

6. The apparatus of claim 3 wherein the means for stripping the article comprises:

means for producing a current of air through the male die to blow the formed article off of the male die; and a plunger slidably disposed in the male die so as to be movable between a retracted position wherein the plunger is disposed in the male die and an extended position wherein a portion of the plunger extends from the lower end of the male die so as to cooperate with the means for producing a current of air to strip the article from the male die.

7. An apparatus for forming an article from a sheet of material, the apparatus comprising:

a female die having an inner peripheral female die surface defining an opening intersecting one end of the female die;

a male die shaped such that at least a portion of the male die is positionable in the opening of the female die, the male die movable between a discharge position wherein the male die is removed from the opening of the female die such that the sheet of material is positionable between the male die and the female die and a forming position wherein at least a portion of the male die is disposed in the opening of the female die so as to form the article from the sheet of material positioned between the male die and the female die, the range of motion of the male die relative to the female die defining a zone of operation of the male die and the female die;

presence sensing means for sensing the presence of an operator in a sheet feeding area which is located between an operator's station and the zone of operation of the male die and the female die;

control means for initiating an article forming sequence, wherein the male die is moved from the discharge position to the forming position to form the article from the sheet of material and subsequently returned to the discharge position, in response to the operator clearing the presence sensing means subsequent to the operator breaking the presence sensing means while positioning the sheet of material between the male die and the female die via the sheet feeding area;

means for selectively supplying a stream of air between the formed article and the inner peripheral female die surface to release the formed article from the inner peripheral female die surface when the male die and the female die are in the forming position; and means for holding the formed article against the male die to remove the formed article from the female die as the male die and the female die are positioned from the forming position to the discharge position.

8. The apparatus of claim 7 wherein the presence sensing means comprises:

a plurality of light transmitters and a plurality of corresponding light receivers for forming a presence sensing light curtain across the sheet feeding zone.

9. The apparatus of claim 8 wherein the female die further comprises a plurality of openings formed in the inner peripheral female die surface, and wherein the means for supplying the stream of air comprises:

a blower connected to the openings of the inner peripheral female die surface; and a control valve interposed between the blower and the openings of the inner peripheral female die surface so that in one position of the control valve fluid communication is established between the blower and the openings of the inner peripheral female die surface.

10. The apparatus of claim 7 further comprising:

means for stripping the formed article from the male die after the male die has been moved from the forming position to the discharge position.

11. The apparatus of claim 10 wherein the means for stripping the article comprises:

a plunger slidably disposed in the male die so as to be movable between a retracted position wherein the plunger is disposed in the male die and an extended position wherein a portion of the plunger extends from a lower end of the male die.

12. The apparatus of claim 10 wherein the means for stripping the article comprises:

means for supplying a stream of air through the male die to blow the formed article off of the male die.

13. The apparatus of claim 10 wherein the means for stripping the article comprises:

means for supplying a stream of air through the male die to blow the formed article off of the male die; and a plunger slidably disposed in the male die so as to be movable between a retracted position wherein the plunger is disposed in the male die and an extended position wherein a portion of the plunger extends from a lower end of the male die so as to cooperate with the means for supplying a stream of air to strip the article from the male die.

* * * * *